United States Patent [19]

Boyette et al.

[11] Patent Number: 5,512,183
[45] Date of Patent: Apr. 30, 1996

[54] ALKYL-ALLYLPHOSPHONATE COPOLYMER USED FOR BOILER WATER TREATMENT

[75] Inventors: Scott M. Boyette, Wilmington, Del.; Alan E. Goliaszewski, The Woodlands, Tex.

[73] Assignee: Betz Laboratories, Inc., Trevose, Pa.

[21] Appl. No.: 350,879

[22] Filed: Dec. 7, 1994

[51] Int. Cl.[6] ........................................ C02F 5/14
[52] U.S. Cl. ........................ 210/697; 210/698; 210/699; 252/82; 252/180; 252/181
[58] Field of Search .................... 210/698–701, 210/697; 252/82, 180, 181

[56] References Cited

U.S. PATENT DOCUMENTS

| | | | |
|---|---|---|---|
| 2,365,466 | 12/1944 | Hamilton | 260/543 |
| 4,093,580 | 6/1978 | Jones et al. | 210/698 |
| 4,446,028 | 5/1984 | Becker | 210/697 |
| 4,446,045 | 5/1984 | Snyder et al. | 252/180 |
| 4,446,046 | 5/1984 | Becker | 252/181 |
| 4,929,362 | 5/1990 | Chen | 210/701 |
| 5,091,491 | 2/1992 | Quach | 526/278 |
| 5,242,599 | 9/1993 | Chen et al. | 210/699 |
| 5,277,823 | 1/1994 | Hann et al. | 210/696 |

OTHER PUBLICATIONS

Betz Handbook of Industrial Water Conditioning; 8th ed., 1980, pp. 85–96.

*Primary Examiner*—Peter A. Hruskoci
*Attorney, Agent, or Firm*—Alexander D. Ricci; Steven D. Boyd

[57] ABSTRACT

A water soluble isopropenylphosphonic acid copolymer composition and method of use thereof are disclosed. The copolymer comprises repeat units (a) of the formula:

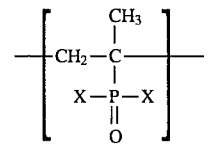

wherein X=OH or OM, wherein M is a cation, and repeat units (b) of the formula:

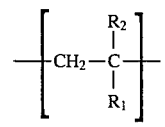

wherein $R_1$ and $R_2$ are independently hydrogen, $C_{1-10}$ linear or branched alkyl, phenyl or alkyl substituted phenyl. The copolymers are effective in inhibiting the precipitation of scale forming salts and also act to inhibit corrosion in boiler water systems.

14 Claims, No Drawings

ALKYL-ALLYLPHOSPHONATE COPOLYMER USED FOR BOILER WATER TREATMENT

FIELD OF THE INVENTION

The present invention relates to a method of inhibiting corrosion and controlling the formation and deposition of scale imparting compounds in aqueous systems such as boiler systems.

BACKGROUND OF THE INVENTION

The problems of corrosion and scale formation and attendant effects have troubled water systems for years. For instance, scale tends to accumulate on internal walls of various water systems such as boiler and cooling systems and thereby materially lessen the operational efficiency of the system.

Deposits in lines, heat exchange equipment, etc., may originate from several causes. For example, precipitation of calcium and magnesium salts and metal oxides in the water system leads to an agglomeration of the scale imparting compounds along or around the metal surfaces which contact the flowing water circulating through the system. In this manner, heat transfer functions of the particular system are severely impeded.

Corrosion, on the other hand, is a degrative electrochemical reaction of a metal with its environment. Simply stated, it is the reversion of refined metals to their natural state. For example, iron ore is iron oxide, iron oxide is refined to steel, when steel corrodes it forms iron oxide which, if left unattended, may result in failure or destruction of the metal. This can cause a particular water system to be shut down until the necessary repairs can be made.

As detailed in the *Betz Handbook of Industrial Water Conditioning,* 8th Edition, 1980, Betz Laboratories, Inc., Trevose, Pa., pages 85–96, the formation of scale and sludge deposits on boiler heating surfaces is a serious problem encountered in steam generation. Current industrial steam producing systems make use of sophisticated external treatment of the boiler feedwater such as coagulation, filtration, softening, etc. These operations are only moderately effective. In all cases, external treatment does not in itself provide adequate treatment since muds, sludge, silts and hardness imparting ions escape treatment and eventually are introduced into the stream generating steam.

In addition to the problems caused by mud, sludge or silts, the industry also has to contend with boiler scale. Although external treatment is utilized specifically in an attempt to remove scale imparting materials from the feedwater, scale formation due to residual hardness such as calcium and magnesium salts is always experienced. Accordingly, internal treatment, i.e., treatment of the water fed to the system is necessary to prevent, reduce and/or retard formation of scale imparting compounds and their deposition. The carbonates of magnesium and calcium are not the only problem compounds as regards scale. Waters having high contents of phosphate, sulfate and silicate either occurring naturally or added for other purposes can cause problems. Calcium and magnesium and any iron or copper present can react and deposit as boiler scale. As is obvious, the deposition of scale on the structural parts of a steam generating system causes poor circulation and lower heat transfer capacity resulting accordingly in an overall loss in efficiency. The use of isopropenyl phosphonic acid polymers and copolymers is described in U.S. Pat. Nos. 4,446,028 and 4,446,046. The ionic phosphonate monomer disclosed in these patents was found to be particularly useful in boiler systems where high temperatures and pressures were well suited to phosphonate chemistry treatment. The monomer unit was polymerized as a homopolymer or with anionic monomer units such as hydroxypropylacrylate.

SUMMARY OF THE INVENTION

The present inventors have discovered that at boiler conditions of high temperature and/or pressure, polymer treatments comprising an ionic phosphonate containing monomer unit and a nonionic alkyl monomer unit can be employed. The use of a nonionic monomer unit in a water treatment polymer is possible because of the unique characteristics of water at boiler conditions. Water at boiler conditions demonstrates physical properties between room temperature water and nonaqueous solvents. For example, water at 315° C. (saturation) has a dielectric constant of 18.25, comparable to isopropyl alcohol at 25° C. of 18.3. This unusual trait allows boiler water to act as a mixed solvent and effectively solubilize both ionic and nonionic groups. Previously, nonionic units were believed to be incompatible with aqueous systems. The copolymers of the present invention have a lower total phosphate concentration than prior art homopolymers (resulting in lower boiler phosphate contributions which is required in certain boiler applications) and a chemistry that takes advantage of the unique properties of water at boiler conditions. The copolymers of the present invention are also driven to inferfaces where corrosion control and scale inhibition are needed.

DETAILED DESCRIPTION OF THE PREFERRED EMBODIMENT

In accordance with the present invention, it has been discovered that a copolymer having repeat moieties (a) and (b) as defined below is efficacious in controlling the formation of mineral and metal oxide deposits and inhibiting corrosion in boiler water systems. Repeat unit moiety (a) has the structure:

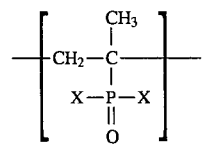

wherein X=OH or OM wherein M is a cation.

Repeat unit moiety (b) has the structure:

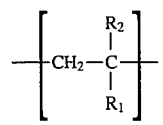

wherein $R_1$ and $R_2$ are chosen from the group consisting of hydrogen, $C_{1-10}$ linear or branched alkyl, phenyl, or alkyl-substituted phenyl groups.

It is to be noted that the terpolymers comprising two or more different members from the repeat unit (b) grouping and a member from the repeat unit (a) grouping are also within the purview of the present invention.

The phosphonic acid monomer corresponding to repeat unit (a) above, which is to be copolymerized with a monomer or monomers corresponding to repeat unit (b), may be prepared by a reaction mechanism involving the nucleophilic addition of PCl$_3$ to the carbonyl group of acetone. For instance, the reaction may proceed in accordance with the following equations:

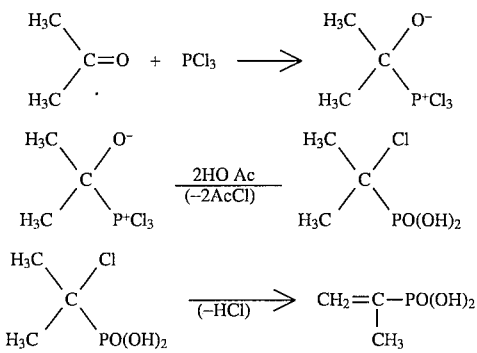

In this manner, the isopropenyl phosphonic acid monomer (a) may be produced in a cost-effective manner due to the relatively low economic cost of the precursor acetone.

It is also possible to produce the desired monomer (a) via dehydration, by heating 2-hydroxy-2-propane phosphonic acid at a temperature of about 125°–250° C. as is detailed in U.S. Pat. No. 2,365,466.

As to monomer (b)—olefin materials are preferred with isobutylene and oligomers of isobutylene such as diisobutylene being most preferred. These moieties can be readily prepared via acid catalyzed oligomerization reactions as are commercially practiced.

After the desired monomers are obtained, copolymerization may proceed under reaction techniques in bulk, suspension, emulsion, solution or thermal polymerization conditions. For instance, a solution system may be used with benzoyl peroxide serving as the initiator. For example, isopropenylphosphonic acid and diisobutylene in ethylene glycol dimethyl ether can be charged to a high pressure autoclave. Reaction at 80°–82° C. produces a copolymer of diisobutylene and isopropenylphosphonic acid. The resulting copolymer preferably have a molar ratio of moieties (a):(b) of from about 3.5 to 0.5:1 and most preferably from about 1:1 to 2:1. The fact that polymers were formed, in accordance with the present invention, has been substantiated by $^{13}$C and $^{31}$P nuclear magnetic resonance spectroscopy.

The copolymers of the present invention should be added to a boiler system, for which corrosion inhibiting and/or deposit control activity is desired, in an amount effective for the purpose. This amount will vary depending upon the particular system for which treatment is desired and will be influenced by factors such as, the areas subject to corrosion, pH, temperature, water quality, and the respective concentrations in the water of the potential scale and deposit forming species. For the most part, the copolymers will be effective when used at levels of from about 0.1 to 500 parts per million of water contained in the boiler system being treated. The copolymers may be added directly into the boiler water system in a fixed quantity and in the state of an aqueous solution either continuously or intermittently.

The copolymers of the present invention can be employed in combination with conventional water treatment agents, including but not limited to: phosphoric acids and water soluble salts thereof; phosphonic acids and water soluble salts thereof; amines; and oxygen scavengers.

Examples of phosphoric acids include orthophosphoric acid, polyphosphoric acids such as pyrophosphoric acid, tripolyphosphoric acid and the like, metaphosphoric acids such as trimetaphosphoric acid, and tetrametaphosphoric acid.

Examples of phosphonic acids include aminopolyphosphonic acids such as aminotrimethylene phosphonic acid, ethylene diamine tetramethylene phosphonic acid and the like, methylene diphosphonic acid, hydroxy ethylidene-1,1-diphosphonic acid, 2-phosphonobutane-1,2,4-tricarboxylic acid, etc.

Examples of amines include morpholine, cyclohexylamine, piperazine, ammonia, diethylaminoethanol, dimethyl isopropanolamine, methylamine, dimethylamine, methoxypropylamine, ethanolamine, diethanolamine, and hydroxylamine sulfite, bisulfite, carbohydrazide, citric acid, ascorbic acid and salt analogs.

Examples of oxygen scavengers include hydroquinone, hydrazine, diethylhydroxylamine, hydroxyalkylhydroxylamine, etc.

When the copolymer of the present invention is added to the aqueous system in combination with additional components, the copolymer may be added separately, as in the form of an aqueous solution. The copolymers may be added either continuously or intermittently. Alternatively, the copolymers may be blended with the above noted materials and added, in the form of an aqueous solution, to the aqueous system either continuously or intermittently.

The copolymers of the present invention may be used in combination with conventional corrosion inhibitors for iron, steel, copper, copper alloys, or other metals, conventional scale and contamination inhibitors, metal ion sequestering agents, and other conventional water treatment agents.

EXAMPLES

The present invention will now be further described with reference to a number of specific examples which are to be regarded solely as illustrative and not as restricting the scope of the present invention.

Example 1

Preparation of Copoly(Diisobutylene/Isopropenylphosphonic Acid)

A high pressure autoclave was charged with 0.11 moles of isopropenylphosphonic acid and 0.132 moles of diisobutylene in ethylene glycol dimethyl ether. The components were reacted for 4 hours at 80° to 82° C. Benzoyl peroxide was used as the polymer initiator. $^{13}$C and $^{31}$P nuclear magnetic resonance spectra indicated approximately 10 to 30% incorporation of diisobutylene into the polymer reaction product.

Test Methodology for Copolymers

The copolymer boiler treatment tests were performed in a research scale model boiler. The research boiler was a D-shaped electrically heated stainless steel assembly with two 4,000 watt electric immersion heaters that produced 19 pounds per hour steam at 1,450 psig and 15 cycles. The tests were run for 44 hours. Blowdown and steam samples were monitored for pH, conductivity, and specific metal concentration. The feedwater for the research boiler was supplied from a demineralized source that supplies a two-tank feed system. One tank was used to feed soluble iron, while a second tank was used to feed the copolymer, sodium phosphate, and pH adjusters. Both tanks were continuously sparged with nitrogen and one contained a chemical oxygen scavenger. Each tank had a separate feedline that supplied the test solutions directly to the heated section of the boiler, preventing any premature mixing of the two feed supplies. Tank 1 contained 5.0 ppm Fe. A small aliquot of sulfuric acid was added to assure that the iron remained in solution. Tank 2 contained sodium carbonate, a small aliquot of a silica standard, hydrazine as an oxygen scavenger and phosphate. A predetermined amount of copolymer was added during the polymer test runs.

During 44 hour test runs, daily blowdown samples were analyzed for iron. The analysis was used to monitor the transport of iron out of the boiler. In addition, the blowdown samples were tested for conductance and pH, with conductance indicating proper chemical feed, and blowdown pHs were controlled between pH 9.7 and 10.0 fitting a pH range that is optimal for iron chemistry in the tested phosphate concentration range.

At the conclusion of the test runs, the heater probes were removed, and the heated sections analyzed for iron, phosphate, hardness and silica. The mass of analyzed contaminants was added to the weight of filtered insolubles remaining after acid digestion and converted to a deposit weight density (DWD). The DWDs for both probes were averaged and used for comparison to deposit control in a system with 10 ppm of copolymer treatment added. % DWD was calculated relative to the average O concentration polymer run DWD's. This value shows the relative deposit after treatment with the material being tested. A lower % DWD indicates better deposit control.

Table I summarizes research boiler test results for poly-(isopropenylphosphonic acid) [PIPPA] and copoly(diisobutylene/isopropenylphosphonic acid) [DIB/IPPA]. Test results for untreated (blanks) runs are also included.

TABLE I

| | Research Boiler Results | | | | | |
|---|---|---|---|---|---|---|
| | Blank | Blank | DIB/IPPA | DIB/IPPA | PIPPA | PIPPA |
| Cycled Polymer Conc. (ppm) | 0 | 0 | 10 | 10 | 10 | 10 |
| % DWD** | 94 | 106 | 12.8 | 9.36 | 10.7 | 11.4 |
| BD* Cond. (day 2) | 230 | 300 | 300 | 320 | 320 | 315 |
| BD* Fe (day 2) | 0.19 | 0.25 | 1.61 | 0 | 1.72 | 1.89 |
| BD $PO_4$ (day 2) | 13.1 | 21.2 | 23.5 | 27.1 | 16.2 | 14.8 |
| Cycles | 15.3 | 21.2 | 15.5 | 19 | 15.2 | 14.6 |

*BD = blowdown
**relative to average blank

The data in Table I shows that all treated runs had similar conductivities and good cycles control. The ionic/nonionic copolymer of the present invention provided deposition inhibition comparable to a commercial ionic control agent PIPPA. Iron transport was also comparable.

While the present invention has been described with respect to particular embodiments thereof, it is apparent that numerous other forms and modifications of the invention will be obvious to those skilled in the art. The appended claims and this invention generally should be construed to cover all such obvious forms and modifications which are within the true scope and spirit of the invention.

We claim:

1. A method of controlling the deposition of scale imparting precipitates on the structural parts of a boiler water system comprising adding to said boiler water system an effective amount for the purpose of a water soluble copolymer consisting essentially of repeat unit moieties (a) and (b), said repeat unit moiety (a) having the structure:

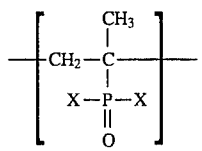

wherein X=OH or OM, wherein M is a cation, said repeat unit moiety (b) having the structure:

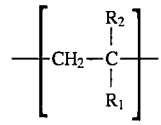

wherein $R_1$ and $R_2$ are independently hydrogen, $C_{1-10}$ linear or branched alkyl, phenyl, or alkyl substituted phenyl, said copolymer having a molar ratio of a:b of from about 3:1 to about 0.5:1.

2. The method of claim 1 wherein said copolymer is added to said boiler water system in an amount of from about 0.1 to 500 parts copolymer per 1 million parts of said boiler water system.

3. The method of claim 1 further comprising adding to said system an effective amount for the purpose of a compound selected from the group comprising phosphoric acids and water soluble salts thereof, phosphonic acids and water soluble salts thereof, amines and oxygen scavengers.

4. The method of claim 3 wherein said phosphoric acid is a member selected from the group consisting of orthophosphoric acid, primary phosphoric acid, secondary phosphoric acid, pyrophosphoric acid, tripolyphosphoric acid, trimetaphosphoric acid, tetrametaphosphoric acid and water soluble salts thereof.

5. The method of claim 3 wherein said phosphonic acid is a member selected from the group consisting of aminotrimethylene phosphonic acid, ethylene diamine tetramethylene phosphoric acid, methylene diphosphonic acid, hydroxyethylidene-1,1-diphosphonic acid and 2-phosphonobutane 1,2,4-tricarboxylic acid.

6. The method of claim 3 wherein said amine is selected from the group consisting of morpholine, cyclohexylamine, piperazine, ammonia, diethylaminoethanol, dimethyl isopropanolamine, methylamine, dimethylamine, methoxypropylamine, ethanolamine, diethanolamine, and hydroxylamine sulfite, bisulfite, carbohydrazide, citric acid, ascorbic acid and salt analogs.

7. The method of claim 3 wherein said oxygen scavenger is selected from the group consisting of hydroquinone, hydrazine, diethylhydroxylamine, and hydroxyalkylhydroxylamines.

8. A method of transporting and removing iron from a boiler water system comprising adding to said boiler water system an effective amount for the purpose of a water soluble copolymer consisting essentially of repeat unit moieties (a) and (b), said repeat unit moiety (a) having the structure:

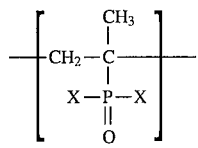

wherein X=OH or OM, wherein M is a cation, said repeat unit moiety (b) having the structure:

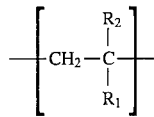

wherein $R_1$ and $R_2$ are independently hydrogen, $C_{1-10}$ linear or branched alkyl, phenyl, or alkyl substituted phenyl, said copolymer having a molar ratio of a:b of from about 3:1 to about 0.5:1.

9. The method of claim 8 wherein said copolymer is added to said boiler water system in an amount of from about 0.1 to 500 parts copolymer per 1 million parts of said boiler water system.

10. The method of claim 8 further comprising adding to said system an effective amount for the purpose of a compound selected from the group comprising phosphoric acids and water soluble salts thereof, phosphonic acids and water soluble salts thereof, amines and oxygen scavengers.

11. The method of claim 10 wherein said phosphoric acid is a member selected from the group consisting of orthophosphoric acid, primary phosphoric acid, secondary phosphoric acid, pyrophosphoric acid, tripolyphosphoric acid, trimetaphosphoric acid, tetrametaphosphoric acid and water soluble salts thereof.

12. The method of claim 10 wherein said phosphonic acid is a member selected from the group consisting of aminotrimethylene phosphonic acid, ethylene diamine tetramethylene phosphoric acid, methylene diphosphonic acid, hydroxyethylidene-1,1-diphosphonic acid and 2-phosphonobutane 1,2,4-tricarboxylic acid.

13. The method of claim 10 wherein said amine is selected from the group consisting of morpholine, cyclohexylamine, piperazine, ammonia, diethylaminoethanol, dimethyl isopropanolamine, methylamine, dimethylamine, methoxypropylamine, ethanolamine, diethanolamine, and hydroxylamine sulfite, bisulfite, carbohydrazide, citric acid, ascorbic acid and salt analogs.

14. The method of claim 10 wherein said oxygen scavenger is selected from the group consisting of hydroquinone, hydrazine, diethylhydroxylamine, and hydroxyalkylhydroxylamines.

* * * * *